United States Patent
Rose

(10) Patent No.: US 8,375,475 B2
(45) Date of Patent: Feb. 19, 2013

(54) METHOD AND DEVICE FOR MAKING A HEAT EXCHANGING GARMENT

(75) Inventor: Joseph L. Rose, Pembroke (CA)

(73) Assignee: Flight Suits, El Cajon, CA (US)

( * ) Notice: Subject to any disclaimer, the term of this patent is extended or adjusted under 35 U.S.C. 154(b) by 158 days.

(21) Appl. No.: 12/951,641

(22) Filed: Nov. 22, 2010

(65) Prior Publication Data

US 2011/0120624 A1   May 26, 2011

Related U.S. Application Data

(60) Provisional application No. 61/263,336, filed on Nov. 20, 2009.

(51) Int. Cl.
*A41D 27/02* (2006.01)
*A41D 13/005* (2006.01)
*A41D 27/00* (2006.01)

(52) U.S. Cl. .......... 2/458; 2/456; 2/81; 2/97; 2/272

(58) Field of Classification Search .......... 2/456, 458, 2/2.15, 2.16, 69, 81, 97, 102, 272
See application file for complete search history.

(56) References Cited

U.S. PATENT DOCUMENTS

| | | | | |
|---|---|---|---|---|
| 3,295,594 A | * | 1/1967 | Hopper | ............ 165/46 |
| 3,610,323 A | | 10/1971 | Troyer | |
| 4,691,762 A | | 9/1987 | Elkins et al. | |
| 5,320,164 A | * | 6/1994 | Szczesuil et al. | ............ 165/46 |
| 5,384,079 A | * | 1/1995 | Bur et al. | ............ 264/21 |
| 5,415,222 A | | 5/1995 | Colvin et al. | |
| 5,538,583 A | | 7/1996 | Szczesuil et al. | |
| 5,755,275 A | * | 5/1998 | Rose et al. | ............ 165/46 |
| 6,109,338 A | | 8/2000 | Butzer | |
| 6,276,155 B2 | * | 8/2001 | Siman-Tov et al. | ......... 62/259.3 |
| 6,298,907 B1 | | 10/2001 | Colvin et al. | |
| 6,565,699 B1 | | 5/2003 | Szczesuil et al. | |
| 6,813,783 B2 | | 11/2004 | Szczesuil et al. | |
| 6,901,608 B2 | | 6/2005 | Szczesuil et al. | |
| 6,979,382 B2 | | 12/2005 | Szczesuil et al. | |
| 7,089,995 B2 | | 8/2006 | Koscheyev et al. | |
| 7,124,593 B2 | | 10/2006 | Feher | |
| 2010/0273944 A1 | * | 10/2010 | Kobayashi et al. | ............ 525/55 |
| 2011/0095523 A1 | * | 4/2011 | Rose | ............ 285/122.1 |

* cited by examiner

*Primary Examiner* — Bobby Muromoto, Jr.
(74) *Attorney, Agent, or Firm* — Eleanor M. Musick; Procopio, Cory, Hargreaves & Savitch LLP

(57) ABSTRACT

A method is provided for making a fluid-circulating heat exchanging garment, the method including providing a fabric panel for assembly of the heat exchanging garment, defining a tubing layout on the fabric panel with straight portions and bend portions defined in a flexible tubing. The straight portions of the tubing are affixed to the fabric panel and a mold is inserted into the inner radius of each bend portion. The mold has a shape corresponding to each bend portion and a channel having a radius adapted to closely fit over the tubing. The fabric panel and tubing are heated to an annealing temperature of the tubing. After cooling the fabric panel, the molds are removed, leaving the tubing reshaped at the bend portions to a desired radius.

15 Claims, 6 Drawing Sheets

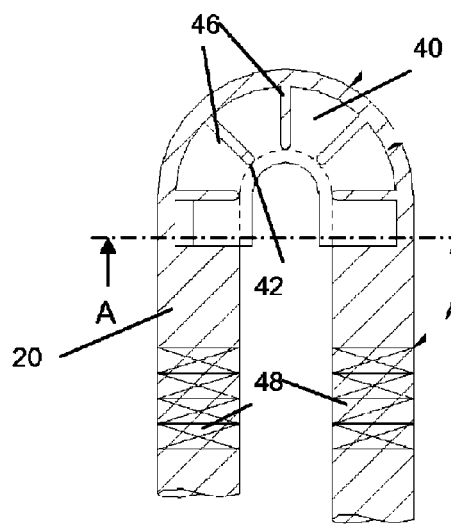
FIG. 9a
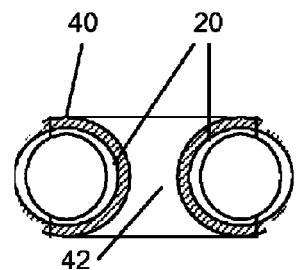
FIG. 9b
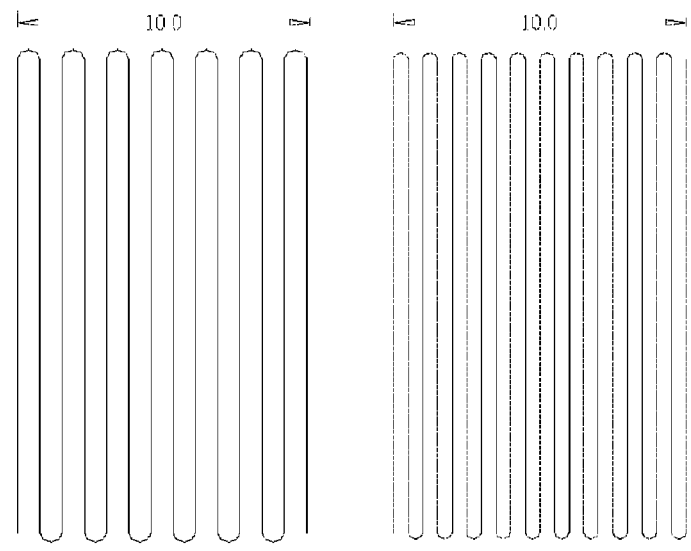
FIG. 10a
PRIOR ART
FIG. 10b

METHOD AND DEVICE FOR MAKING A HEAT EXCHANGING GARMENT

RELATED APPLICATIONS

The present application claims the priority of U.S. provisional application No. 61/263,336 filed Nov. 20, 2009, which is incorporated herein by reference in its entirety.

GOVERNMENT RIGHTS

This invention was made with government support under Contract No. W911QY-08-C-0081, awarded by United States Army Research, Development & Engineering. The government has certain rights in the invention.

FIELD OF THE INVENTION

The present invention relates to a method for fabricating heat-exchanging garments and other fabric items that are temperature-controlled by circulating a liquid through conduits attached to or incorporated in the fabric.

BACKGROUND OF THE INVENTION

Members of the military, fire fighting personal and other emergency responders, and others who are required to operate in extreme temperature environments, for example, in the desert, near fires, or at latitudes approaching the Polar Regions, frequently rely on garments that have heat exchanging liquids flowing therethrough in order to maintain a safe body temperature. In addition, workers in hazardous chemical, thermal and manufacturing environments must wear personal protective equipment (PPE) to minimize their exposure to hazardous substances, however, the PPE can limit the body's ability to shed excess heat. Flexible heat exchangers have proven to be one of the most effective methods of adding or extracting heat from the human body. These garments include flexible tubing that is incorporated into the garment to carry cooling or heating fluids in close contact with the wearer's body. In general, heating or cooling garments are exemplified by U.S. Pat. Nos. 3,451,812; 3,425,486; 3,419,702; 4,691,762; 4,718,429; and 4,998,415. Other types of systems for body heating and cooling are illustrated in U.S. Pat. Nos. 4,114,620 and 5,062,424.

A liquid cooled garment ("LCG") is an over-garment normally consisting of a fabric shell and a labyrinth of flexible tubing affixed in some fashion to the shell. LCG's are flexible heat exchangers used to assist in control of human body temperature where a person's physiology may not adequately control the body temperature because of the environmental conditions or because Personal Protective Clothing (PPE) is being worn. A liquid is cooled and circulated through the LCG. The liquid is cooler than the skin temperature of the user so that heat is transferred from the user to the liquid. Liquid chillers can be as simple as a water/ice bath or as complicated as a vapour compression refrigeration device. Whichever device is used, it lowers the temperature of the liquid below the skin temperature of the user and mechanically re-circulates the liquid through the LCG.

The conduit or tubing used in heat exchanging garments is typically formed from flexible polyvinylchloride (PVC), polyurethane, or similar polymers, which can be attached to the base fabric using any of three methods. The first and most common uses a standard zigzag sewing machine with a custom foot to keep the tubing centered. The second method, which was introduced by NASA, uses a base garment formed from a mesh material with the tubing "woven" through the fabric. The third and most current method was developed at the U.S. Army Garrison—Natick. This microclimate cooling garment ("MCG"), which is described in U.S. Pat. No. 5,320,164 of Szczesuil, et al., uses specialty tooling and fabric to create a two layer lamination with the PVC tubing locked between the layers in a complex pattern employing ten separate flow circuits. The Natick technology is the most widely deployed to date.

The MCG is designed to remove 180 watts of heat when fluid is circulated at a temperature of 65° F. and a rate of 12 gallons per hour. The MCG consists of two cooling panels, one that covers the front of the user's torso, and one that covers the back. Five hook and loop straps are located on the front panel for fit and size adjustment—three on the torso and one at each shoulder, as illustrated in FIG. 1.

The tubing network is distributed across the user's torso and is typically divided into ten parallel circuits. No matter how the cooling garment is constructed, all require the use of manifolds or miniature fittings to create individual flow circuits. An example of a simple multi-circuit construction is provided in FIG. 2, which illustrates a typical prior art tubing/manifold assembly with two four-port manifolds 2 and 4, for connection to inlet line 14 and outlet line 18, respectively, via barbed fittings 12 and 16. Manifold 2 has four ports 6a-6d, the barbed ends of which insert into tubes 8a-8d, respectively. The outlet ends of tubes 8a-8d are fitted over ports 10a-10d of manifold 4 after which the flexible tubing 8a-8d is secured to the manifold using a cyanoacrylate adhesive and a NYLON® cable tie (not shown). Such construction is intended to minimize back pressure (resistance to flow) and optimize heat transfer. Most cooling garments, whether zigzag sewn or woven, use miniature barbed fittings. The two cooling panels are attached to one another by a manifold pocket, which accommodates two manifold assemblies. The MCG uses a ten port barbed manifold, an example of which is shown in FIG. 3. Such manifolds provide the interface between the supply/return tubing and the individual tubing circuits. The manifold pocket and the supply/return tubing are located on the right side of a standard garment. An improved manifold with improved flexibility and reduced backpressure is described in co-pending application Ser. No. 12/910,821, which is incorporated herein by reference.

There are advantages to both sewn and laminated technologies. Referring to FIG. 4, laminated technology uses a "pattern board", in which the circuit design is transferred to a flat plate 22 (normally phenolic) in the form of grooves 23 are machined into the board. Lightweight fabric 24, pre-coated with fusible material, is placed across the pattern board and tubing 28 is forced into the grooves, on top of the fabric 24. An outer layer 25 of fusible coated fabric (the coating is shown as a separate adhesive layer 26) is then placed over the tubing and the layers are subjected to heat and pressure to produce the lamination, thus sealing the tubing into the same pattern as the grooves.

One advantage of the laminated technology is that close radius bends can be formed without tubing distortion or kinking. Because the tubes are secured and supported in the grooves of the pattern board, the tubes retain their original aspect ratio until they are subjected to the heating process. During the heating process the tubing approaches the plastic temperature of the resin and the tubing is annealed to the new geometry. Because the tubing has been re-shaped by the annealing process, the short radius bends, on the order of 0.5 inch (~12.7 mm), are stress relieved, as shown in FIG. 5.

Disadvantages of laminated technology include the cost of the tooling, including the pattern boards and thermal press, and the specialized treatment required for the fabrics to make them fusible. One pattern board is required for each front and back of each design/size. Most MCG designs are produced in at least three sizes, requiring a minimum of six pattern boards for production. For an efficient and cost-effective manufacturing process, three sets of pattern boards are needed, making a total of eighteen pattern boards for each design. Design changes to laminated MCG's can be costly and time consuming because the new design must be transferred to a machine program and new pattern boards fabricated. In addition, fabrics used in the lamination process include a fusible material (polyamide or polyurethane) to facilitate thermal lamination. This process is specialized and requires that large batches of fabric be treated to be cost effective. The lead time for the treatment may be weeks or months, such that accurate demand and manufacturing projections are required to meet production schedules.

Sewn technology is usually accomplished with a zigzag sewing machine. These machines are standard throughout the sewing industry and require only a custom presser foot, such as that shown in FIG. 6, to guide the tubing during the sewing process. One disadvantage to the sewn technology is that a long radius is required, as shown in FIG. 7. Any radius smaller than 0.75" can distort and kink over time, which can restrict flow through the LCG circuit and adversely affect cooling performance.

One advantage to sewn technology is its simplicity. Although a custom presser foot is required, only standard sewing and marking equipment is necessary to produce reliable and repeatable results, an example of which is shown in FIG. 8. Design changes require only a revised pattern which can be quickly and cost effectively produced.

Given the drawbacks of the existing methods, the need remains for a method for manufacturing heat exchanging garments that is not limited by the radius bends in the tubing that carries the heat exchanging fluid.

BRIEF SUMMARY OF THE INVENTION

According to the present invention, processes are provided for preventing kinks from forming in flexible tubing during assembly of the garment.

In one approach to providing an improve method for manufacturing heat-exchanging garments, a fabricated radius bend (FRB) process is used to produce a kink-free bend with a smaller radius, so that the tubing can be packed more densely within the garment, even when sewing is used to assemble the garment.

The FRB process employs a miniature tube fitting that is solvent bonded into the tubing network at each bend. The FRB process produces a reliable and repeatable manufacturing technique for robust, high density cooling garments. The miniature fittings are universal, typically in only a U-shape and an elbow-shaped fitting is needed for use any design or size garment. Because it does not require design sensitive molds or fixtures, the FRB process adapts easily to design changes or requirements.

In a preferred embodiment, a "dynamic fabricated radius bend", or "DFRB" process produces an equivalent radius to one produced using the FRB, but the bends are not discrete fittings, thus avoiding potential failure points. Instead, the process uses DFRB molds, which are miniature tools that are temporarily added to the tubing network during garment fabrication. When the tubing process is completed, the garment is subjected to a similar heating and cooling (annealing) process to that used in the FRB fabrication process after which the DFRB tooling is removed.

In one aspect of the invention, a method is provided for making a fluid-circulating heat exchanging garment, the method including: providing a fabric panel comprising a portion of the heat exchanging garment; defining a tubing layout on the fabric panel, the tubing layout comprising a plurality of straight portions and a plurality of bend portions in a flexible tubing; affixing the straight portions of the tubing to the fabric panel; inserting a mold into an inner radius of each of the plurality of bend portions, the mold having a shape corresponding to each bend portion and a channel having a radius adapted to closely fit over the tubing; heating the fabric panel and tubing assembly with the molds to an annealing temperature; cooling the fabric panel; and removing the molds from the bend portions.

In another aspect of the invention, a device is provided for forming a radius bend in tubing of a fluid-circulating heat exchanging garment, where the device is a mold having a shape and a radius corresponding to an inner radius of a bend portion in a flexible tubing having a plurality of straight portions affixed to a fabric panel and joined by a plurality of bend portions, the mold comprising a channel having a radius adapted to closely fit over the tubing, wherein the mold is formed from a material having a melting point higher than a melting point of the flexible tubing, and wherein the mold is adapted to retain the tubing within the channel during annealing of the tubing so that the tubing is reshaped into the shape of the mold, the mold further adapted to be removed after the tubing is shaped.

The DFRB process produces a robust, high density heat exchanging garment with increased reliability (no joints) and improved flow characteristics. The elimination of the FRB joints provides a process that is less labor intensive, resulting in a more economical garment.

In an exemplary embodiment, at locations where a change in direction of the tubing is required, a curved channel of thermoplastic referred to as the DFRB mold is inserted into the inner radius of each loop defined by the bend in the tubing. In one embodiment, the DFRB is held in place with an O-ring. In the preferred embodiment, the DFRB is formed from a channel that creates an interference fit with the tubing to hold it in place by simply snapping the DFRB in place. The assembly is then heated to anneal the plastic tubing so that it forms to the curvature of the DFRB mold. The mold is then removed, leaving a smooth, small radius bend in the tubing.

BRIEF DESCRIPTION OF THE DRAWINGS

FIG. 9a is a diagrammatic side view of a tubing bend with a mold according to the present invention.

FIG. 9b is a cross-sectional view taken along line A-A of FIG. 9a.

FIGS. 10a and 10b are exemplary tubing layout designs according to the prior art and present invention, respectively.

DETAILED DESCRIPTION

As used herein, the term "heat-exchanging garment" includes conventional clothing items such as vests, jackets, pants, hoods, boots, gaiters, sleeves, chaps and the like, as well as other fabric-based products such as blankets, pads, wraps, sheets and other items that incorporate liquid-circulating tubing that may be placed in contact with a body to assist in control of the body temperature.

As used herein, the term "fabric" means a flexible, sheet material from which a heat-exchanging garment may be formed, including natural, synthetic textiles and blends thereof, both woven and non-woven, which may include plastic-, polymer-, and paper-based materials.

As used herein, "tubing" refers to any form of fluid-conducting conduit through which a heat-exchanging liquid may be circulated in close proximity to a body to assist in control of body temperature.

According to the inventive process, the heat-exchanging garments are constructed from patterns according to standard industry procedures. When a 45, 90 or 180 degree bend in the tubing is required, a dynamic fabricated radius bend (DFRB) mold with the appropriate angle is inserted into the circuit. An example of one embodiment of a DFRB mold is shown in FIG. 9a.

In the embodiment illustrated, DFRB mold 40 is a U-shaped section that is placed over the tubing 20 at the inner radius 42 of the tube bend to produce a 180 degree bend in the tubing. The radius of the U-shaped section corresponds to the desired bend radius to be formed in the tubing. The DFRB mold 40 is formed from a material that retains its shape at temperatures above the melting point of the tubing, e.g., a thermoplastic material, so that the tubing is held firmly within the mold during heating. The DFRB mold is semi-circular in cross-section, as shown in FIG. 9b, to define a channel that fits closely over the outer wall of the tubing along the inner radius 42. As illustrated, cuts 46 in the edges of the channel of the DFRB mold may be used to facilitate formation of the proper curvature as well as making it easier to fit over the tubing. Preferably, the mold will be close enough in diameter to the tubing outer diameter that it will snap in place and be held in place by an interference fit.

Figure 1:
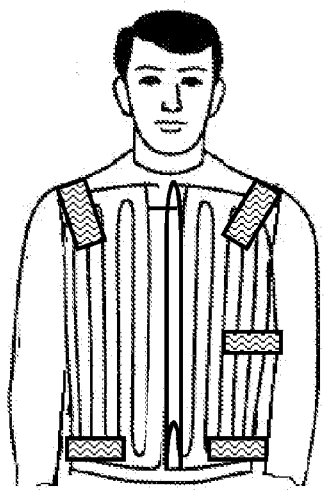
FIG. 1 is a diagrammatic front view of prior art heat exchanging garment worn by a user.
Figure 2:
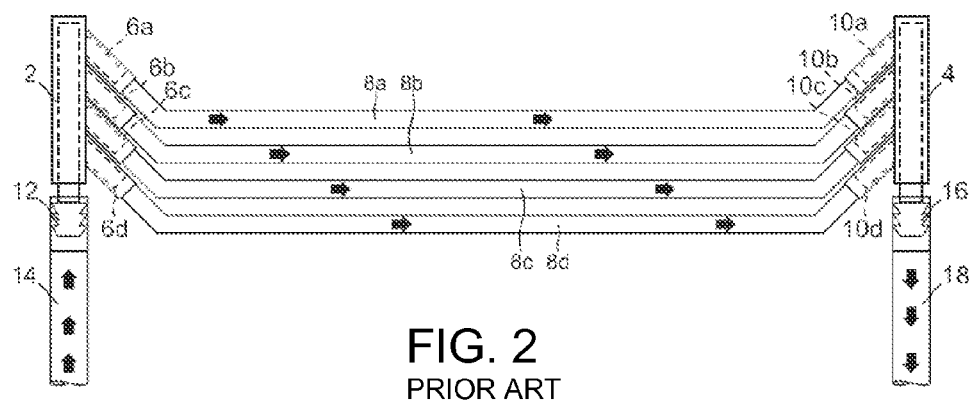
FIG. 2 is a schematic for a simple four circuit liquid cooled garment according to the prior art.
Figure 3:
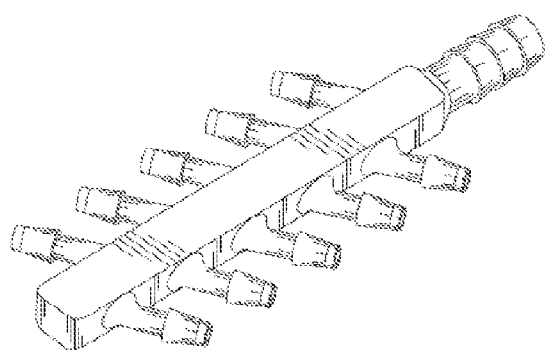
FIG. 3 is a perspective view of a barbed manifold used in prior art LCGs.
Figure 4:
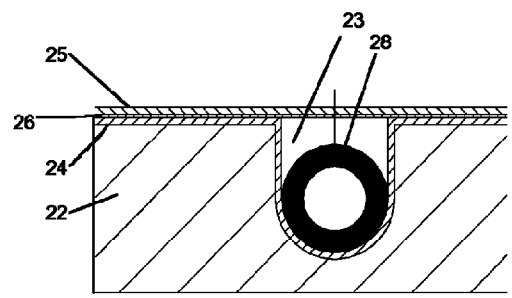
FIG. 4 is a diagrammatic cross-section of a laminated LCG.
Figure 5:
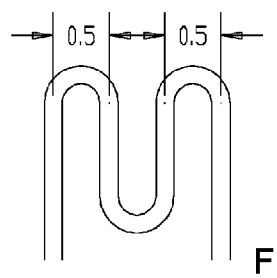
FIG. 5 is a diagrammatic view of close radius bends that are possible using a laminated construction.
Figure 6:
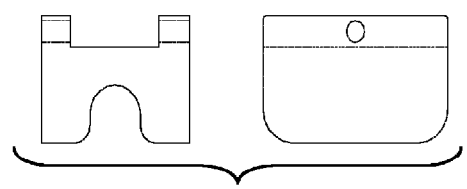
FIG. 6 illustrates a modified presser foot for use in sewn construction.
Figure 7:
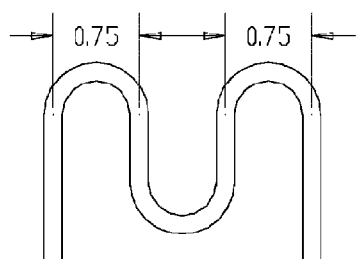
FIG. 7 is a diagrammatic view of long radius bends within an LCG of sewn construction.
Figure 8:
FIG. 8 is a diagrammatic view of standard zigzag stitching used in sewn construction according to the prior art.
Figure 11:
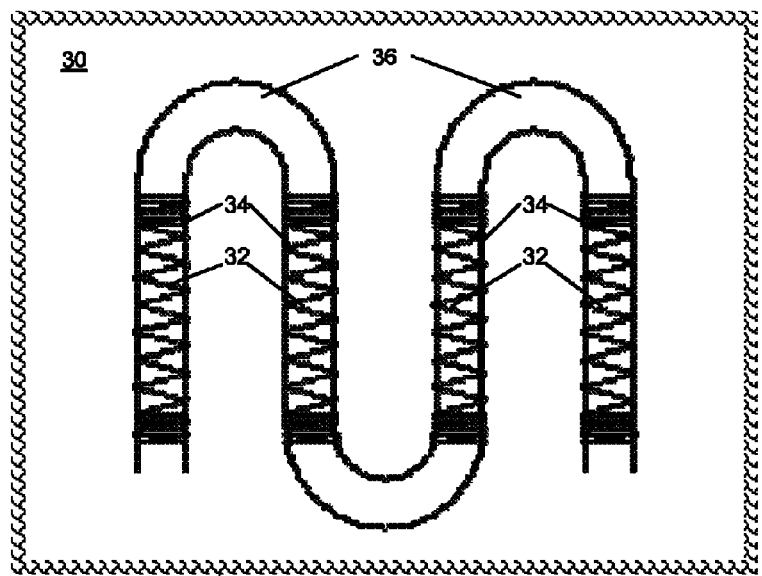
FIG. 11 shows the modified zigzag stitching that can be used in sewn construction using the DFRB technology.
Figure 14A:
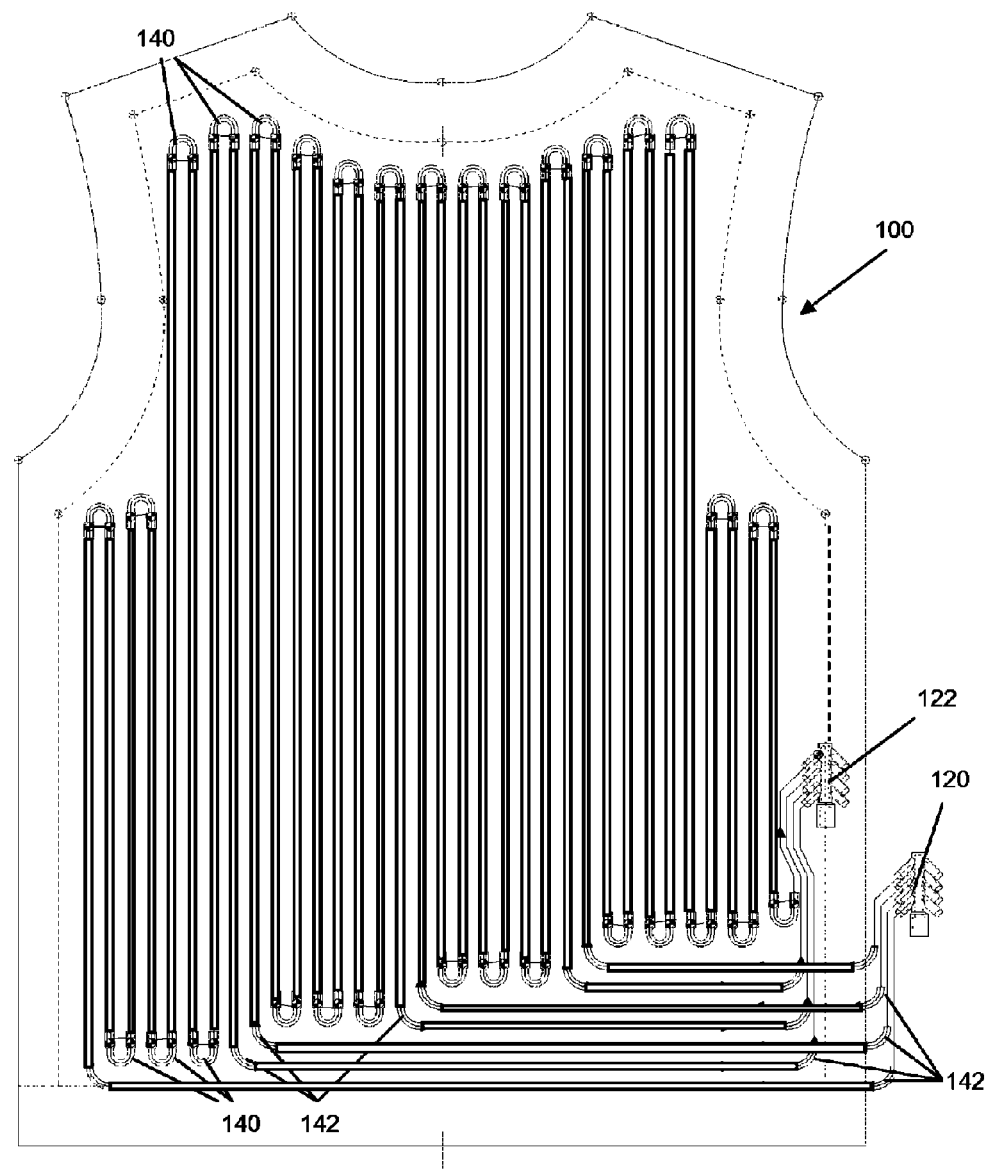
FIGS. 14a and 14b are rear and front schematic views, respectively, of a vest constructed according to the present invention showing an example of the increased tubing density allowed by the inventive manufacturing process.
Figure 14B:
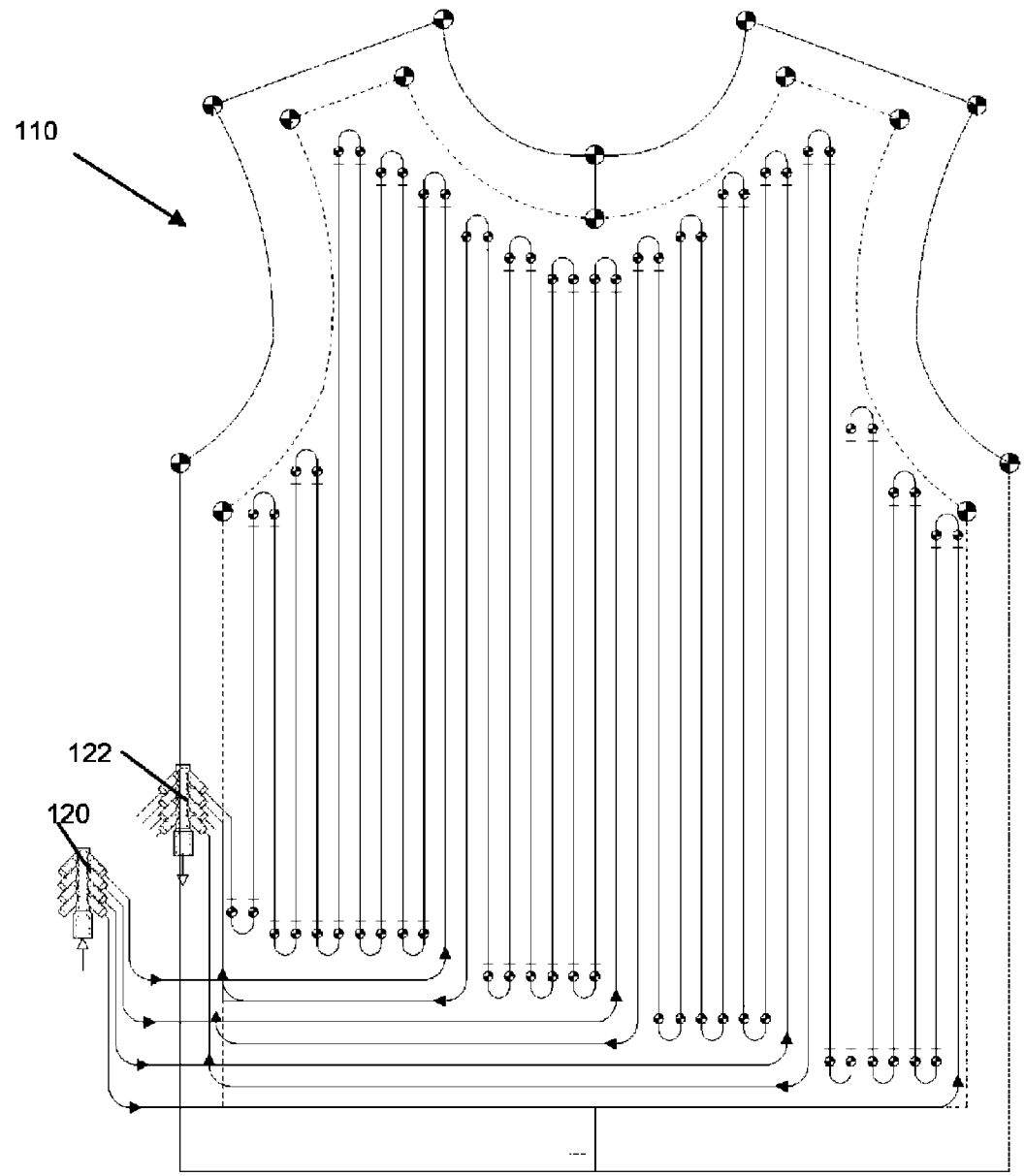

A typical heat exchanging garment may have from sixty to a hundred bends in the tubing that require treatment. The fabric pieces are laid out on a work surface and the tubing is arranged in a pattern optimized to provide coverage of the wearer's body (or body part) with heat-exchanging structures. One example of a tubing pattern for a vest or jacket is illustrated in FIGS. 14a and 14b. The tubing is sewn to the fabric pieces using a special zipper foot of a design similar to that shown in FIG. 6. However, unlike the prior art practice of zigzag stitching along the entire length of the tubing, including the bends (as shown in FIG. 8), only the long, straight stretches of tubing are zigzag stitched to the fabric. FIG. 11 illustrates one possible tubing layout, where straight sections 34 of tubing 20 are sewn to fabric 30 by stitching 32, leaving the bends 36 exposed.

When the tubing layout process is completed, include sewing along the lengths 34 of tubing 20, the assembly is exposed to sufficient heat, e.g., 250° F.-350° F. (121° C.-177° C.), for a predetermined time to anneal the plastic and reform the tubing bends. "Annealing" refers to the heating of a polymer to just below the melting point so that the plastic molecules are reconfigured, re-setting the plastic's "memory." Typically, heat is applied by a heat press platen, which uniformly heats the assembly from both sides. The DFRB molds are removed and the tubing near the bends may optionally be secured with back tacking 48 if necessary, as shown in FIG. 9a.

FIGS. 10a and 10b provide a comparison of different pitch layouts for prior art sewn process (minimum 0.75") and DFRB process (minimum 0.5"), respectively. The tighter tubing layout enabled by use of the DFRB process allows a significant increase in the total length, i.e., density, of tubing that can be placed within a fixed area, thus providing superior heat exchanging capability. In the example illustrated, for a 10 inch (254 mm)×20 inch (508 mm) area, the prior art sewn construction is covered by a total of 280 inches (711 cm) of tubing, compared to the DFRB process construction, which provides a total of 420 inches (1067 cm) of tubing.

Figure 12A:
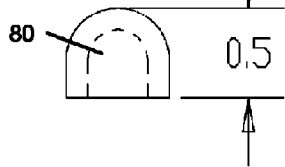
FIG. 12 is a diagrammatic view of a DFRB fixture according to the present invention.
Figure 12B:
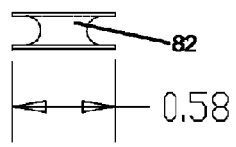

An alternative embodiment of the DFRB mold 80 for a 180 degree bend is illustrated in FIGS. 12a and 12b. As described above, mold 80 includes a channel portion 82 which has a diameter that is dimensioned to closely fit over the tubing, preferably producing an interference fit between the channel 82 and the tubing. The mold 40 or 80 may be fabricated from any material capable of withstanding typical annealing temperatures of 250° F.-350° F. (121° C. to 177° C.). For testing purposes, DFRB molds were CNC machined from acetal plastic resin, which has a melting point of about 320° F. (160° C.). Any thermoplastic resin, wood, phonolic or glass material may be used. Selection of appropriate materials will depend on the type of tubing being used. The DFRB molds are reusable and, therefore, depending on the materials used in fabrication, could potentially last for thousands of cycles. It will be readily apparent to one of skill in the art that the molds are not limited to 180 degree bends, and that different curvatures may be used to form 45°, 90°, and any other angle bends that may be needed.

Figure 13:
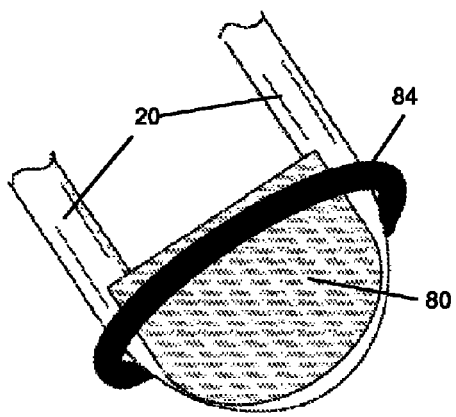
FIG. 13 is a diagrammatic top view of an O-ring in place for securing the tubing to the DFRB fixture.

In one embodiment of the inventive process, a DFRB mold 80 is placed in the inner radius of the tubing 20 where each bend is to be located, as illustrated in FIG. 13. An O-ring 84 may be used to hold the tubing 20 securely in the channel of each DFRB mold during the annealing process. After all of the DFRB molds 80 and O-rings 84 have been placed in an assembly of tubing and fabric, the assembled panel is subjected to annealing to reshape the tubing bends.

FIGS. 14a and 14b illustrate examples of completed front and rear panels 100 and 110, respectively, of a vest or the body of a jacket. (Note that the tubing illustrated in FIG. 14b is represented by a single line to indicate the layout pattern only. The actual tubing thickness will correspond to that of the front panel.) Input manifold 120 and output manifold 122 are connected to an array of tubing which is attached to the panel as described above. In a preferred embodiment, the manifolds used are those described in cop-pending application Ser. No. 12/910,821, filed Oct. 24, 2010, the disclosure of which is incorporated herein by reference. Two eight port manifolds are illustrated, but more or fewer ports may be used based upon backpressure and flow rate requirements for the particular garment design.

The DFRB molds 140 and 142 are positioned at each of the bends (180° and 90° bends, respectively, are shown.) Optional O-rings, if used, are placed at the bends as shown in FIG. 13. The assembled panel is laid out on a heat press platen. The heating press is closed and the panel is subjected to elevated temperature for a specified time. The temperature and annealing time are dictated by the fabrics used and the tubing resin. In a preferred embodiment, the tubing material used to manufacture heat exchanging garments is flexible PVC (polyvinylchloride). The melting point of PVC is in the range of 100-260° C. The annealing temperature will be below the melting point, but close enough to the melting point to effect the desired reconfiguration. Selection of appropriate temperature and annealing times are within the level of skill in the art and will not require undue experimentation. After the panel has cooled, the DFRB molds and, if used, O-rings are removed, leaving a stress-relieved, close radius bend in the tubing. An option next step may include backtacking of the tubing near the bends for enhanced stability. The garment is then completed using conventional techniques.

Table 1 below summarizes the differences between the prior art methods and the inventive DFRB process.

TABLE 1

| Technology | Tooling Cost | Design Change Effort/Cost | Cooling Performance | Fabric Coatings |
|---|---|---|---|---|
| Laminated | High | High | Most Effective | YES |
| Sewn | Minimal | Minimal | Least ~-35% | NO |
| Sewn/DFRB | Medium | Minimal | Most Effective | NO |

The foregoing description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for making a fluid-circulating heat exchanging garment, comprising:
providing a fabric panel comprising a portion of the heat exchanging garment;
defining a tubing layout on the fabric panel, the tubing layout comprising a plurality of straight portions and a plurality of bend portions in a flexible tubing;
affixing the straight portions of the tubing to the fabric panel;
inserting a separate U-shaped mold into an inner radius of each of the plurality of bend portions, the mold having a curved edge corresponding to a desired curvature of each bend portion and a side channel defined within the curved edge having a semi-circular cross-section adapted to closely fit over a portion of an outer surface of the tubing corresponding to the inner radius;
heating the fabric panel and tubing assembly with the molds to an annealing temperature;
cooling the fabric panel; and
removing the molds from the bend portions.

2. The method of claim 1, wherein affixing comprises sewing the tubing to the fabric panel.

3. The method of claim 1, further comprising, after inserting the mold, disposing an O-ring over an outside of the bend portion.

4. The method of claim 1, further comprising, after removing the molds, backtacking the tubing near the bend portions.

5. The method of claim 1, wherein the mold is formed from thermoplastic.

6. The method of claim 1, wherein heating comprises placing the fabric panel in a heat press platen.

7. A method for making a fluid-circulating heat exchanging garment, comprising:
providing a fabric panel comprising a portion of the heat exchanging garment;
defining a tubing layout on the fabric panel, the tubing layout comprising a plurality of straight portions and a plurality of bend portions in a flexible tubing;
sewing the straight portions of the tubing to the fabric panel;
inserting a separate U-shaped mold into an inner radius of each of the plurality of bend portions, the mold having a curved edge corresponding to a desired curvature of each bend portion and a side channel defined within the curved edge having a semi-circular cross-section adapted to closely fit over a portion of an outer surface of the tubing corresponding to the inner radius;
placing the fabric panel and tubing assembly into a heat press platen;
heating the fabric panel and tubing assembly with the molds to an annealing temperature;
cooling the fabric panel; and
removing the molds from the bend portions.

8. The method of claim 7, further comprising, after inserting the mold, disposing an O-ring over an outside of the bend portion.

9. The method of claim 7, further comprising, after removing the molds, backtacking the tubing near the bend portions.

10. The method of claim 7, wherein the mold is formed from thermoplastic.

11. A device for forming a radius bend in tubing of a fluid-circulating heat exchanging garment, comprising:
mold having a single U-shaped edge with a radius corresponding to an inner radius of a bend portion in a flexible tubing having a plurality of straight portions affixed to a fabric panel and joined by a plurality of bend portions, the mold comprising a curved edge with a side channel having a semi-circular cross-section adapted to closely fit over a portion of the outer surface of the tubing corresponding to the inner radius, wherein the mold is formed from a material having a melting point higher than a melting point of the flexible tubing, and wherein the mold is adapted to retain the tubing within the channel during annealing of the tubing so that the tubing is reshaped into the shape of the mold, the mold further adapted to be removed after the tubing is shaped.

12. The device of claim 11, further comprising an O-ring adapted for fitting over the bend portion of the tubing and the mold to hold the mold in place.

13. A method for making a fluid-circulating heat exchanging garment comprising providing a fabric panel comprising a portion of the heat exchanging garment, defining a tubing layout on the fabric panel, the tubing layout comprising a plurality of straight portions and a plurality of bend portions in a flexible tubing, affixing the straight portions of the tubing to the fabric panel, heating the fabric panel and tubing assembly to an annealing temperature, and cooling the fabric panel, the improvement comprising:

prior to heating the fabric panel, inserting a separate U-shaped mold into an inner radius of each of the plurality of bend portions, the mold having a curved edge corresponding to a desired curvature of each bend portion and a side channel defined within the curved edge having a semi-circular cross-section adapted to closely fit over a portion of an outer surface of the tubing corresponding to the inner radius; and after cooling the fabric panel, removing the molds from the bend portions.

14. The method of claim 13, further comprising, after inserting the mold, disposing an O-ring over an outside of the bend portion.

15. The method of claim 13, further comprising, after removing the molds, backtacking the tubing near the bend portions.

* * * * *